United States Patent [19]
Kuhl et al.

[11] 3,962,576
[45] June 8, 1976

[54] METHOD AND APPARATUS FOR AUTOMATIC GENERATION OF PHASE-ADAPTED COHERENT SECONDARY RADIATION IN A NON-LINEAR CRYSTAL

[75] Inventors: Jürgen Kuhl, Aalen; Hans-Jörg Spitschan, Heidenheim (Brenz), both of Germany

[73] Assignee: Carl Zeiss-Stiftung, Oberkochen, Germany

[22] Filed: Jan. 17, 1975

[21] Appl. No.: 542,016

[30] Foreign Application Priority Data
Jan. 25, 1974 Germany.......................... 2403501

[52] U.S. Cl.............................. 250/201; 332/7.51
[51] Int. Cl.² .................................. G01J 1/20
[58] Field of Search............ 332/7.51; 350/160 R, 350/107; 250/201, 199; 331/94.5; 330/4.3

[56] References Cited
UNITED STATES PATENTS

| | | | |
|---|---|---|---|
| 2,655,074 | 10/1953 | Eckert et al. | 356/107 |
| 3,328,723 | 6/1967 | Giordmaine et al. | 332/7.51 |
| 3,579,145 | 5/1971 | De Lange | 332/7.51 |
| 3,747,004 | 7/1973 | Sasnett | 330/4.3 |
| 3,748,597 | 7/1973 | Reinhart | 250/199 |
| 3,787,887 | 1/1974 | Burton | 332/7.51 |
| 3,825,845 | 7/1974 | Angelbeck et al. | 331/94.5 A |

Primary Examiner—Archie R. Borchelt
Assistant Examiner—D. C. Nelms
Attorney, Agent, or Firm—Stonebraker, Shepard & Stephens

[57] ABSTRACT

Secondary radiation in a non-linear crystal is produced by irradiating the crystal with a coherent primary radiation, to produce a coherent phase-adapted secondary radiation whose frequency is doubled with respect to the frequency of the primary radiation. In a modification of the method, two different sources of primary radiation are used, in such a way that the secondary radiation in the crystal is equal to the sum or the difference of the frequencies of the primary radiation sources. In apparatus for carrying out the method, the crystal to be irradiated is mounted in a swinging or tiltable carrier. The emerging radiation is partially reflected onto a pair of photoelectric detectors, the output of which controls a servomotor to vary the degree of tilt of the crystal. In a second embodiment, there are two crystals tilting in opposite directions. In a third embodiment of the apparatus, two separate sources of primary radiation serve to irradiate a single crystal. Instead of tilting the crystal, it may be subjected to different temperatures in order to produce the desired adaptation of the phases of the primary and secondary radiation.

14 Claims, 3 Drawing Figures

METHOD AND APPARATUS FOR AUTOMATIC GENERATION OF PHASE-ADAPTED COHERENT SECONDARY RADIATION IN A NON-LINEAR CRYSTAL

BACKGROUND OF THE INVENTION

This invention relates to a method and apparatus for generating a phase-adapted coherent secondary radiation in a non-linear crystal by irradiation with a coherent primary radiation, the frequency of the secondary radiation being doubled with respect to the frequency of a primary radiation or changed with respect to the frequencies of two differing primary rays by a sum or difference formation of the primary frequencies.

Coherent secondary radiation may be generated in crystals by utilizing non-linear polarization effects which are caused by the electric fields of an intensive coherent primary radiation, the frequency of the secondary radiation being changed with respect to the frequency of the primary radiation. A laser beam of the frequency $f$ applied to a double-refracting crystal may be effective to generate the harmonic wave of the frequency $2f$ in the latter. The influence of laser beams of different frequencies, for instance $f_1$ and $f_2$, may lead in a non-linear crystal to the generation of the coherent secondary radiation of the sum frequency $f_1 + 132 f_2$ or of the difference frequency $f_1 - f_2$. By this generation of secondary radiation the wavelength range of the emission of lasers can be extended. The wavelength range of commercially available dye lasers can be extended by the generation of secondary radiation in a non-linear crystal both to the UV range as also to the IR range. A condition of an effective conversion of a laser radiation acting as primary radiation to a secondary radiation of different frequency is that the primary wave and the secondary wave remain in phase on the irradiation path, i.e., that both waves must have the same phase speed in the non-linear crystal.

For a deduction of the conditions for phase adaption between primary and secondary waves and as pertaining to the prior art, the following explanations are given:

The non-linear interaction between primary and secondary waves is correlated to conditions which take into account the energy and pulse principles.

To maintain the energy and pulse principles the following must apply:

$$f_1 + f_2 = f_3 \tag{I}$$

$$\vec{K_1} + \vec{K_2} = \vec{K_3} \tag{II}$$

with $$|\vec{K_i}| = 2 \pi f_i (n_i/c)$$

wherein $f_i$ = the frequencies,
$\vec{K_i}$ = the wave vectors,
$n_i = n (f_i)$ the refractive indices for the waves,
$c$ = the light velocity in vacuum.

For a colinear transmission the following condition of phase adaption is obtained therefrom:

$$n_1 f_1 + n_2 f_2 = n_3 f_3 \tag{III}$$

This can be satisfied in different non-linear crystals in that the dispersion of the light velocity in the crystal is compensated by the anisotropy of the refractive index.

In double-refracting crystals two types of phase adaption are principally possible:

Type 1: The waves of the frequencies $f_1$ and $f_2$ have the same polarization (both are either ordinary or extraordinary rays).

Type 2: The polarization directions of the waves of the frequencies $f_1$ and $f_2$ are mutually orthogonal (an ordinary and an extraordinary ray).

For the specific case of frequency doubling with phase adaption according to type 1 the condition of phase adaption III changes over to $$n_o (f) = n_e (2f) \tag{IV}$$

wherein the index $o$ refers to the ordinary ray and the index $e$ refers to the extraordinary ray.

In a uniaxial crystal with negative double refraction the condition (IV) can be satisfied if directions exist in the crystal for which the extraordinary refractive index of the frequency $2f$ is just as great as the ordinary refractive index for the frequency $f$. Therefore, if an ordinary polarized wave of the frequency $f$ is passed in this direction through the crystal, then the higher wave generated by the non-linear interaction of the frequency $2f$ is automatically phase-adapted with extraordinary polarization and can be generated cumulatively on the interaction path.

For a uniaxial crystal with positive double refraction instead of (IV) there is required $$n_e (f) = n_o (2f) \tag{V}$$

Frequency doubling in uniaxial crystals with phase adaption according to type 2 requires the satisfaction of the conditions $$n_o (f) + n_e (f) = 2 n_e (2f) \tag{IV'}$$

$$n_o (f) + n_e (f) = 2 n_o (f) \tag{V'}$$

Corresponding formulae for the phase adaption in the sum and difference frequency generation can be deducted by analogous reflections and can be gathered from the literature (for instance, J. E. Midwinter, J. Warner, Brit. J. Appl. Phys. 16, 1135 (1965); G. C. Bhar, D. C. Hanna, B. Luther-Davies and R. C. Smith, Optics Communications 6, 323 (1972). The conditions for phase adaption in biaxial crystals can be gathered from Hobden, J. Appl. Phys. 38, 4365 (1967).

If the emission of one or several frequency-variable lasers is used as primary radiation, then by means of non-linear polarization processes in crystals a frequency-variable coherent radiation in the ultra-violet and in the infra-red spectral range can be generated. For generation of tunable and powerful primary radiation dye lasers are available in the visible spectral range. Band width and wavelength of the emitted radiation of this laser can be varied within wide limits according to the prior art by the use of dispersing elements in the laser resonator.

In the generation of coherent radiation in the wavelength range of approximately between 260 – 350 nm by frequency doubling of dye laser emission a particularly great conversion rate can be obtained in potassium dihydrogen phosphate crystals ($KH_2PO_4$) and in ammonium dihydrogen phosphate crystals (($NH_4$) $H_2$ $PO_4$) which, abbreviated, are also termed KDP- and ADP-crystals. For obtaining a high field strength, the laser beam is focused into the crystal with a lens.

Investigations for frequency doubling of dye laser radiation in KDP- and ADP-crystals have shown that in a focused laser beam the phase adaption condition with irradiation by spectrally narrow-band laser radiation cannot be satisfied for the total aperture angle of the laser beam. See for instance J. Kuhl, H. Spitschan, Optics Communications 5, 382 (1972). The generation of the higher wave, therefore, can only be observed in a very narrow angular range. This leads to the fact that the cross-section of the generated UV-beam is strongly cut depending on the band width of the laser in the critical direction which is determined by the optical axis of the crystal.

As dispersing elements for tuning of the laser emission for instance, diffraction gratings, dispersion prisms, interference filters, Fabry-Perot etalons, achromatic lenses, Lyot-filters, or a combination of several such elements are used. The spectral tuning of the laser radiation in the case of the interference filter can, for instance, be obtained by a variation of the angular position of the filter relative to the direction of the beam. When using a Lyot-filter and Fabry-Perot etalon with a spacer of piezoelectric ceramics the transmission wavelength can be varied by a change in the electric voltage.

If a uniaxial double-refracting crystal is irradiated with the frequency-variable radiation of a dye laser in order to generate frequency-variable secondary radiation of double the frequency, then the condition of phase adaption in the crystal for the respectively irradiated laser frequency and its higher wave must be satisfied, since the refractive indices $n_o$ of the ordinary and $n_e$ of the extraordinary beam show dispersion in different manner. The problem of how to always re-establish the phase adaption in dependence on the variation of the wavelength can be solved, as is well-known, in two manners:

1. Crystal orientation is changed with the frequency by rotation of the crystal about the axis vertical to the optical crystal axis in such a manner that the angle between the direction of the laser beam in the crystal and the optical crystal axis just corresponds to the phase adaption angle for the respective frequency.

2. The crystal temperature and therewith the magnitude of the refractive indices $n_o$ and $n_e$ are changed with the frequency in such a manner that the respective relations (IV) and (V) remain satisfied.

Consequently, the spectral tuning of the secondary radiation generated in the crystal requires the simultaneous change of at least two experimental parameters:

a. the variation of the laser output frequency: By way of example, this is done by a change in the angular position of the dispersing element in the resonator of the laser;

b. the satisfaction of the condition of phase adaption in the double-refracting crystal: by way of example, this is done by a change in the crystal orientation or in the crystal temperature.

Since the angular positions of the crystal and of the dispersing element in the laser resonator change in very different manner and respectively nonlinearly with the wavelength, a coupling of both movements according to the prior art is possible only after the involved dependence has been determined by the provision of a calibration curve. However, the use of a calibration curve requires a sufficient constancy of all experimental parameters, a condition which is not always assured. In particular the recording of a calibration curve is necessary for every new dispersing element which is combined with the crystal.

SUMMARY OF THE INVENTION

It is therefore an object of this invention to provide a method of and a device for the automatic re-tuning of the phase adaption of the secondary radiation to a frequency-variable primary radiation.

According to the invention this object is solved in that the change in the angle between the direction of the secondary radiation and of the optical axis of the crystal, occurring in dependence on the wavelength of the primary radiation, is used for the control of a control loop for re-tuning of the phase adaption of the secondary radiation to the primary radiation.

In order to obtain tunable secondary radiation in a wide emission range, it is advantageous to use a laser of wavelength-variable frequency in the visible range as a source for the primary radiation. With the method of frequency doubling in the crystal it is then possible to obtain a tunable radiation source for the UV-range. In order to control the control loop for re-tuning of the phase adaption, a portion of the secondary radiation is directed onto a laminar detector such that by the local displacement of the direction of the secondary radiation occurring in dependence on the wavelength of the primary radiation an electric signal is generated in the detector whose absolute value is representative of the magnitude of the wavelength change and indicates by its sign whether the wavelength of the primary radiation has become greater or smaller.

If the phase adaption shall be obtained by a change in the crystal orientation with respect to the direction of incidence of the primary radiation, according to the invention the signal generated in the detector is used for the control of a servomotor which corrects the position of the crystal until the phase adaption between primary and secondary radiation has been re-established and the signal re-assumes the value zero.

If the phase adaption shall be obtained by a change in the refractive index in the crystal, the signal generated in the detector is expediently used for the control of a heating furnace surrounding the crystal, which changes the temperature and therewith the refractive index until the phase adaption between primary and secondary radiation has been re-established and the signal re-assumes the value zero.

An advantageous device for carrying out the method according to this invention is characterized in that for obtaining a frequency doubling in the crystal there is provided a tunable dye laser as primary radiation source, that a collecting lens is arranged in the light path of the emitted laser radiation, that the primary radiation emerging from this collecting lens impinges upon the nonlinear crystal mounted in a turntable or tilting mount or carrier, that for carrying out the rotary movement there is provided a servomotor driving the turntable, that furthermore there is provided a partially reflecting plate in the light path of the secondary radiation emerging from the crystal, which directs a portion of the radiation onto one of two juxtaposed photoelectric detectors, and that the photoelectric detector is furthermore followed by an operational amplifier whose output acts on the driving unit of the servomotor. By this device an automatic coupling of the crystal movement to the movement of the dispersing element serving for the wavelength selection in the laser resonator is obtained. The UV-wavelength range generated in the crystal can be tuned through by variation of a single experimental parameter, for instance, the position of the dispersing element in the laser resonator. Besides, by the automatic re-adjustment of the crystal a spatial shift of the emitted UV-light is avoided.

Parallel displacement of the secondary radiation upon tilting of the plane parallel crystal can be avoided or eliminated by embedding the nonlinear crystal in a liquid medium whose refractive index is approximately equal to that of the crystal.

The parallel displacement of the secondary radiation upon tilting of the plane parallel crystal can also be eliminated by the use of two intercoupled crystals rotatable specularly with respect to each other.

For obtaining a frequency change of the secondary radiation in the crystal by sum or difference formation of the frequencies of two primary radiations of different wavelength, an advantageous embodiment of a device for carrying out the method of the invention is used which is characterized in that two lasers are provided as primary radiation sources, of which one emits a fixed frequency, while the frequency of the other can be tuned through, that a deflecting mirror and a partially transmitting mirror are provided which direct the laser radiation onto a collecting lens arranged in the light path, that the nonlinear crystal arranged behind the collecting lens is surrounded by a heating furnace, that a partially reflecting plate is provided behind the crystal, which directs the secondary radiation emerging from the crystal onto the detector, and that furthermore the detector is followed by an operational amplifier which is connected with the driving unit for the power supply of the heating furnace.

The advantages obtained by the invention particularly consist in that by the prevention of a spatial shift of the emitted secondary radiation a falsification of experimental investigations is avoided. Such a falsification would, for instance, be caused when imaging the ray onto a monochromator slit or by a change in the volume of observation in fluorescence measurements by a spatial shift of the emitted secondary ray.

Further advantages are provided by the simplicity of the method and of the device as compared with the prior art of record and by the independence of the method for generating coherent secondary radiation of specific filter and crystal data.

A further advantage that should be mentioned is that the signal detected by the position detector of the device according to the invention can also be used for the control of a heating circuit with temperature tuning of the crystal.

A further advantage of the method resides in the high adjusting accuracy with critical crystal position, since the sensitivity of the method increases with $d\theta\ d\lambda$, $\theta$ being the phase adaption angle and $\lambda$ the wavelength of the primary radiation.

BRIEF DESCRIPTION OF THE DRAWINGS

A few embodiments of the apparatus according to the invention for carrying out the method of the invention are illustrated in the drawing and will now be described more fully.

DESCRIPTION OF THE PREFERRED EMBODIMENTS

Figure 1:
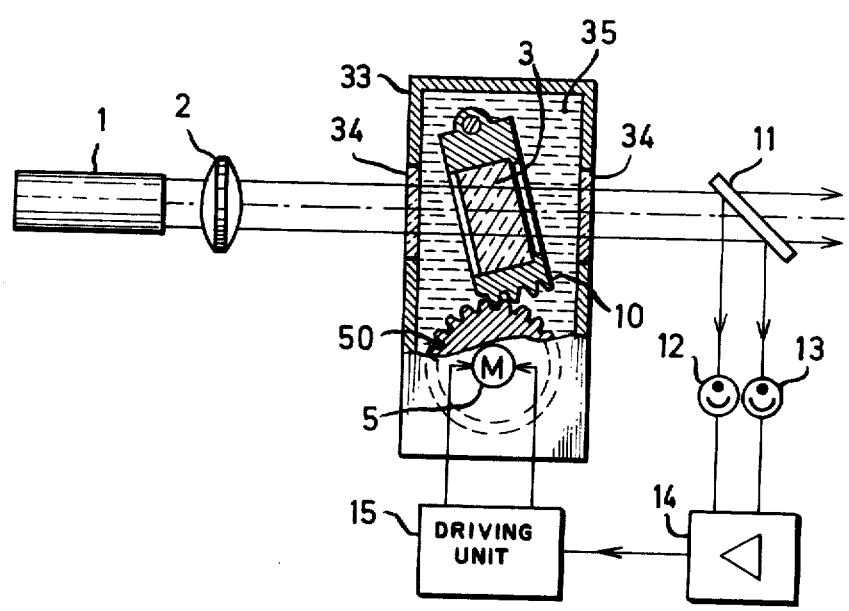
FIG. 1 illustrates a device with a tunable laser as primary radiation source and a rotatably arranged nonlinear crystal for frequency doubling.

FIG. 1 illustrates schematically a dye laser 1 with frequency-variable emission. Tuning of the frequency of the dye laser is effected according to the prior art with a dispersing element incorporated in the laser resonator, for instance an interference filter (not shown). A collecting lens 2 directs the laser radiation onto a nonlinear crystal 3. In this crystal 3 by the formation of the harmonic higher wave the frequency $f$ of the primary radiation is doubled. A parallel displacement of the secondary radiation with respect to the primary radiation which would occur during tilting of the plane parallel crystal 3, is prevented by embedding the crystal 3 in a liquid medium 35 of practically the same refractive index as that of the crystal. The medium is located in a cell 33 with parallel entrance and exit windows 34.

The secondary radiation emerging from a crystal 3 is directed onto a partially reflecting quartz plate 11. The greater portion of the radiation is transmitted by the plate 11 and can be used for the desired experimental purpose, while a small portion of the radiation is directed onto two juxtaposed photoelectric detectors 12 and 13. The output of the two photoelectric detectors connects to the operational amplifier 14 whose output acts on the driving unit 15 for the servomotor 5. The servomotor 5 drives a gear wheel 50 which meshes with gear teeth on the turntable or pivoted carrier 10 in which the crystal 3 is held. If the condition of adaption for the primary radiation adjusted with the laser 1 is satisfied for the phase of the primary radiation and that of the secondary radiation in the crystal 3, both detectors 12 and 13 will receive the same amount of radiation.

With spectral tuning of the laser source 1 the phase adaption in the crystal is satisfied for another frequency of the primary radiation for another direction of the secondary radiation. This becomes noticeable in a shift of the light spots impinging upon the photoelectric detectors 12, 13. Then, one of the photoelectric detectors receives a greater amount of light than the other. As a consequence thereof, the photoelectric currents in the detectors 12, 13 are different. Thereby, a signal is generated whose level supplies information on the absolute amount of the wavelength change and whose sign supplies information on the direction of the wavelength change, i.e., whether the wavelength of the primary radiation was changed toward greater or toward smaller wavelengths. The signal is amplified by the operational amplifier 14 whose output initiates movement of the servomotor 5 via the driving unit 15, which then adjusts the orientation of the crystal 3 until the phase adaption between primary radiation and secondary radiation has been re-established. By this closed control loop the phase adaption of the secondary radiation to the primary radiation is assured for each wavelength of the tunable laser 1, and the crystal emits a secondary radiation of double the frequency, tunable by the laser 1. For adjustment it is only necessary that the crystal orientation for the phase adaption condition is adjusted but once for a single wavelength.

Figure 2:
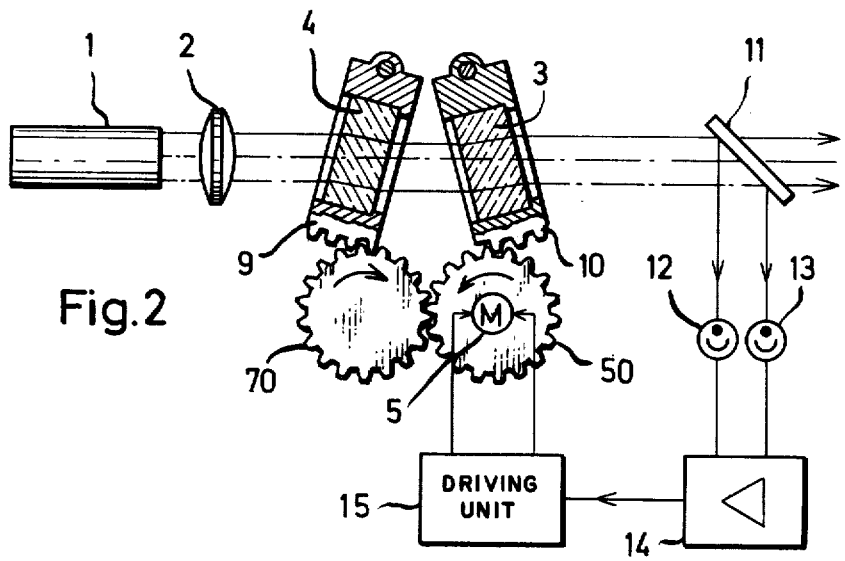
FIG. 2 illustrates a device with a tunable laser as primary radiation source and two intercoupled nonlinear crystals rotatable specularly with respect to each other for frequency doubling.

In the embodiment illustrated in FIG. 2, the parallel displacement of the secondary radiation which occurs upon tilting of the plane parallel crystal 3 is elminated by the use of a second plane parallel crystal 4 in a second swinging or tiltable holder or carrier 9 coupled with the carrier of the crystal 3 and rotatable specularly in the opposite direction with respect to the same. The rotation of the crystal 4 is effected via the gear wheel 70 which meshes with the gear teeth of the carrier or turntable 9 and the teeth of the gear wheel 50 and is thereby carried along by the drive of the servomotor 5. This enables the elimination of the cell 33 and the liquid bath 35. Otherwise the construction is the same and operates in the same way as in FIG. 1.

Figure 3:
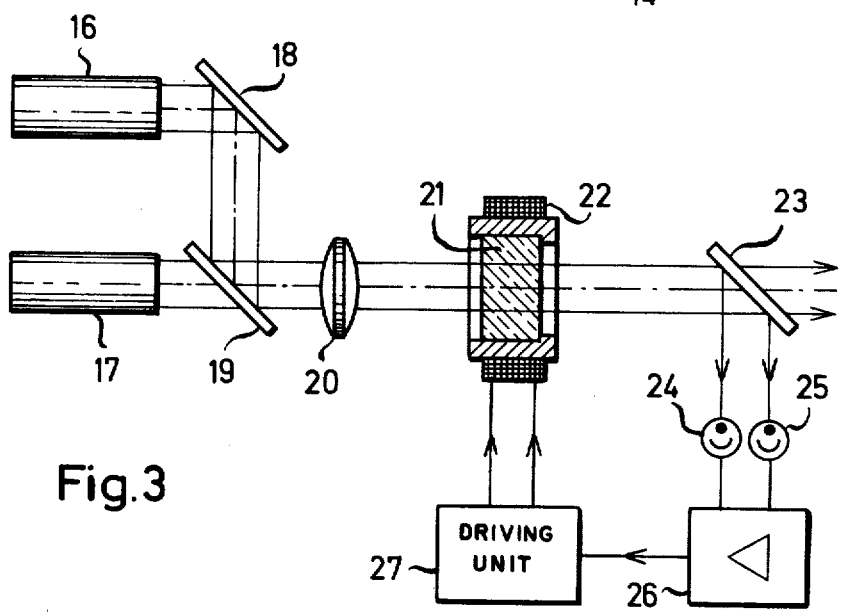
FIG. 3 illustrates a device with a tunable laser and a non-tunable laser as primary radiation source and a heatably arranged nonlinear crystal for sum or difference formation of the irradiated primary frequencies.

A third embodiment is illustrated in FIG. 3, which uses two different lasers 16 and 17 as sources of primary rays, the laser source 16 emitting radiation of a single frequency, while the laser source 17 can be tuned through in a great wavelength range just as well as the laser source 1 of FIG. 1. The colinear laser radiations from the two sources 16 and 17 are passed to the nonlinear crystal 21 via the deflecting mirror 18 and the partially transmitting mirror 19 through the collecting lens 20. The crystal 21 is surrounded by a heating furnace 22. The secondary radiation emerging from the crystal 21 is directed again to a partially reflecting quartz plate 23 just as in the device illustrated in FIG. 1. Like the plate 11 in FIGS. 1 and 2, this plate 23 directs a portion of the radiation onto the photoelectric detectors 24 and 25 which, like the detectors 12 and 13 in the previous embodiments, are again connected to an operational amplifier 26 which in turn connects to the driving unit 27.

This driving unit, of conventional construction, supplies the current for the heating furnace 22 which is adjusted during initial adjustment of the device to such a temperature that the difference frequency $f_1 - f_2$ is produced as secondary radiation for a specific wavelength of the laser 17. In this case, the photoelectric detectors 24 and 25 receive the same amount of radiation. If the wavelength of the laser source 17 is changed, the conditions of adaption for the phases of the primary radiation and of the secondary radiation will be detuned, leading to a shift of the light spot of the secondary radiation onto the photoelectric detectors 24 and 25. Thereby, the photoelectric detectors 24, 25 are irradiated with different intensity. Thus in turn a signal is generated whose magnitude depends on the absolute value of the wavelength change and whose sign depends on the direction of the wavelength change. This signal is amplified in the operational amplifier 26 and directed onto the driving unit 27 which then changes the heating current for the heating furnace 22 until by the temperature of the crystal 21 the new phase adaption of the secondary radiation with the new wavelength of the primary radiation is again fulfilled.

Besides the difference formation $f_1 - f_2$ also a sum formation of the primary frequencies $f_1 + f_2$ is possible in the embodiment illustrated in FIG. 3.

The method of phase adaption by means of temperature change of the crystal is not restricted to the embodiment illustrated in FIG. 3 in which two lasers are used as primary radiation sources. It can also be carried out with only one tunable laser.

What is claimed is:

1. The method of generating in a non-linear crystal a phase-adapted coherent secondary radiation by irradiation of such crystal with coherent primary radiation of variable wavelength the frequency of the secondary radiation being changed with respect to the frequency of the primary radiation, there being a change in angle between an optical axis of the crystal and an axis of the secondary radiation as a result of changing the wavelength of the primary radiation, said method comprising the steps of providing means for re-tuning a phase adaption of the secondary radiation to the primary radiation, providing sensing means having an output responsive to a change in said angle, and operating said re-tuning means from said output of said sensing means.

2. The method defined in claim 1, wherein a laser with variable wavelength emission is used as a source for said primary radiation, and wherein said sensing means includes a first detector and a second detector having electrical signal outputs when respectively irradiated, said method comprising the step of directing a portion of said secondary radiation onto one or the other of said detectors, respectively, in response to spatial displacement of the axis of the secondary radiation occurring in dependence on the wavelength of the primary radiation, to generate an electrical output from one or the other of said detectors, the absolute value of such output representing the magnitude of the spatial displacement of said axis and the sign of such output indicating whether the wavelength of the primary radiation has become larger or smaller.

3. The method defined in claim 2, comprising the further steps of providing means mounting the crystal for movement relative to an axis of said primary radiation, providing a servomotor for moving said crystal, and operating said servomotor from the electrical signal outputs of said detectors to move said crystal until a predetermined phase relationship between said primary radiation and said secondary radiation has been established and said electrical signal outputs assume a zero value.

4. The method defined in claim 2, comprising the further steps of providing heating means for changing the temperature of said crystal, thereby to vary the phase relationship between said primary radiation and said secondary radiation, and controlling the heating means from the electrical signal outputs of said detectors to change the temperature of said crystal until a predetermined phase relationship between said primary radiation and said secondary radiation has been established and said electrical signal outputs assume a zero value.

5. Apparatus for maintaining a desired phase relationship between a coherent primary radiation and a coherent secondary radiation produced by irradiating a non-linear crystal by such primary radiation, said appratus comprising a source of coherent primary radiation of variable wavelength, means for projecting coherent primary radiation from said source along a projection path, means for holding a non-linear crystal in said path in position to receive and to be irradiated by said coherent primary radiation, such irradiation producing in the crystal a secondary radiation having an axis which differs from an optical axis of said crystal by an angle which varies in response to variations in the wavelength of the primary radiation, means for re-tuning said crystal to bring said secondary radiation into a desired phase relationship with said primary radiation when it has become out of phase as a result of a change in wavelength of said primary radiation, detecting means, means for delivering part of said secondary radiation to said detecting means, and means responsive to the secondary radiation received by said detecting means for operating said re-tuning means to re-tune said crystal to achieve the desired phase relationship.

6. Apparatus as defined in claim 5, wherein said detecting means comprises two juxtaposed photoelectric detectors so placed that one of them receives a greater amount of said secondary radiation when said angle increases and the other of them receives a greater amount of said secondary radiation when said angle decreases as a result of a change in wavelength of said primary radiation, and wherein said means responsive to the radiation received by said detecting means includes an amplifier for amplifying an output from said photoelectric detectors and a servomotor operated by an output of said amplifier, said servomotor operating said re-tuning means.

7. Apparatus as defined in claim 5, wherein said means for holding said crystal is tiltable to tilt said crystal relative to said projection path of said primary radiation, and wherein said means for re-tuning said crystal includes means for tilting said holding means.

8. Apparatus as defined in claim 7, further comprising means for embedding said crystal in a bath of liquid having a refractive index substantially equal to that of said crystal, to compensate for lateral displacement of an axis of output of secondary radiation from said crystal which would otherwise occur upon tilting of said crystal if it were not embedded in said liquid bath.

9. Apparatus as defined in claim 7, further comprising means for tiltably holding a second non-linear crystal in said projection path and spaced along said path from the first mentioned crystal, and means for coupling the two crystals to each other to tilt them simultaneously in opposite directions, the crystals being so placed and dimensioned that a lateral displacement of an axis of output of secondary radiation from one crystal, caused by tilting of such crystal, is substantially compensated by a substantially equal displacement in the opposite direction of the axis of output from the other crystal, caused by the tilting in the opposite direction of the other crystal.

10. Apparatus as defined in claim 5, wherein said means for re-tuning said crystal includes means for varying the temperature of said crystal.

11. Apparatus as defined in claim 5, wherein said source of coherent primary radiation is two lasers at least one of which can be tuned, further comprising a deflecting mirror for deflecting output radiation from one laser toward the projection path of the other laser, and a partially transmitting mirror in said projection path for receiving deflected radiation from the first laser and transmitting it along said projection path of said other laser, and a collecting lens in the path of combined radiation from both lasers, for transmitting such combined radiation to said crystal.

12. Apparatus as defined in claim 11, wherein the frequency of the coherent primary radiation produced by the first laser is different from the frequency of the coherent primary radiation produced by the second laser, and the frequency of the coherent secondary radiation produced by said crystal is equal to the sum of the frequencies of said radiation produced by the two lasers.

13. Apparatus as defined in claim 11, wherein the frequency of the coherent primary radiation produced by the first laser is different from the frequency of the coherent primary radiation produced by the second laser, and the frequency of the coherent secondary radiation produced by said crystal is equal to the difference between the frequencies of said radiation produced by the two lasers.

14. Apparatus as defined in claim 5, wherein the frequency of the coherent secondary radiation produced by said crystal is double the frequency produced by said source of coherent primary radiation.

* * * * *